April 28, 1931. G. LARCHER 1,802,725
MOVING DIORAMA
Filed April 24, 1930 5 Sheets-Sheet 1
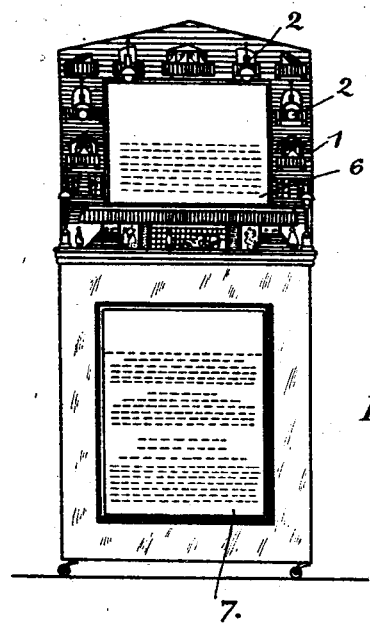
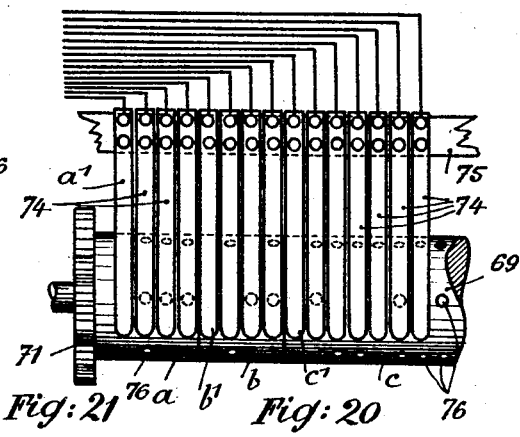
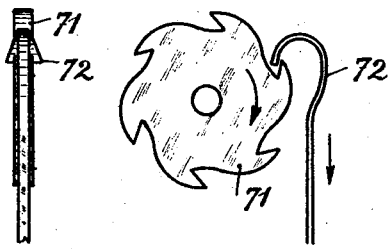
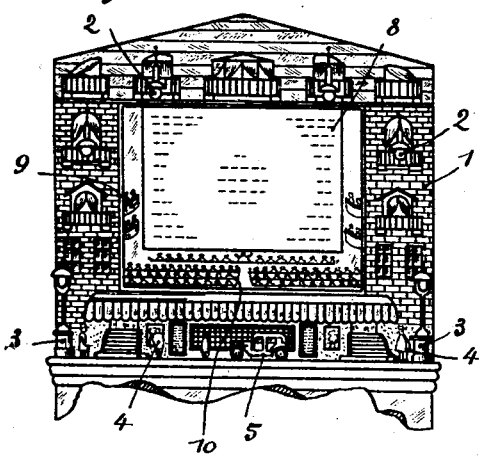
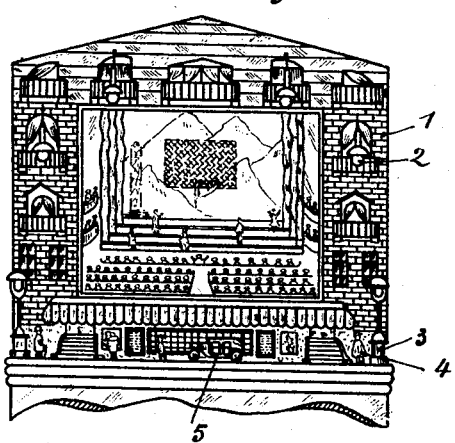
Georges Larcher
INVENTOR;
By [signature]
his Attorney April 28, 1931. G. LARCHER 1,802,725
MOVING DIORAMA
Filed April 24, 1930 5 Sheets-Sheet 2
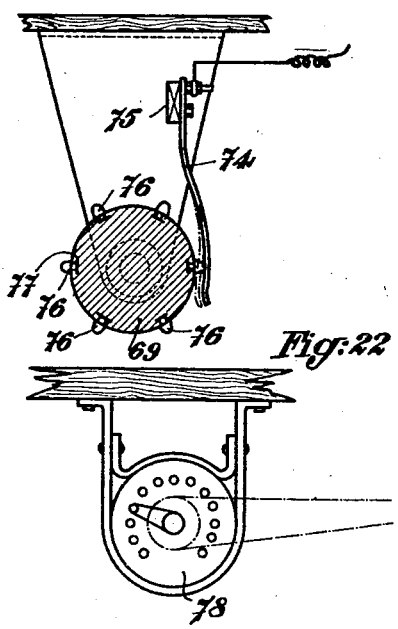
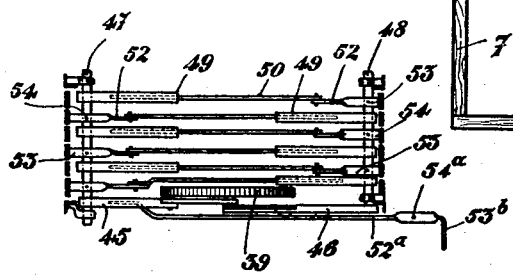
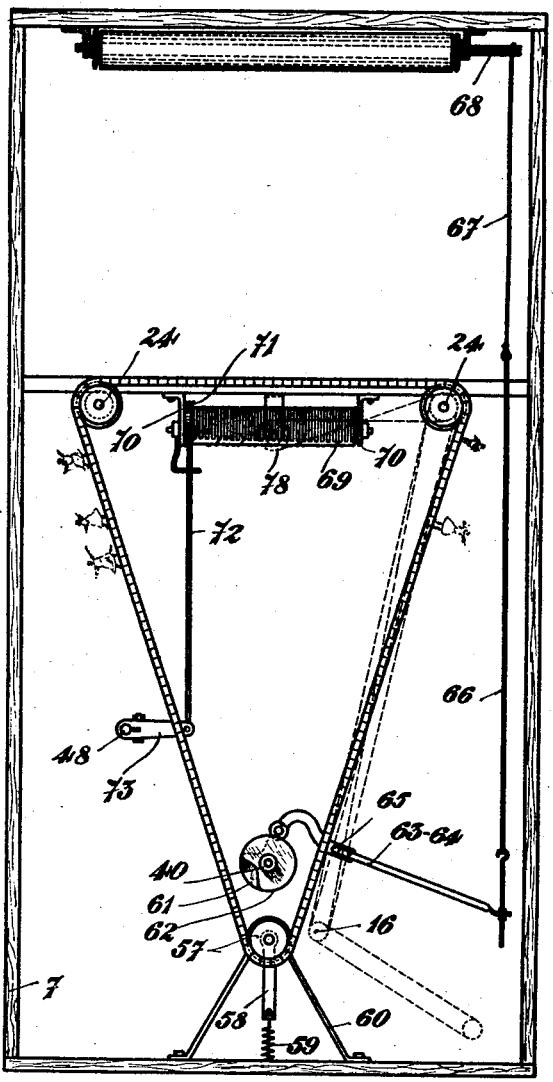
Georges Larcher
INVENTOR;
his Attorney.

April 28, 1931. G. LARCHER 1,802,725
MOVING DIORAMA
Filed April 24, 1930 5 Sheets-Sheet 3
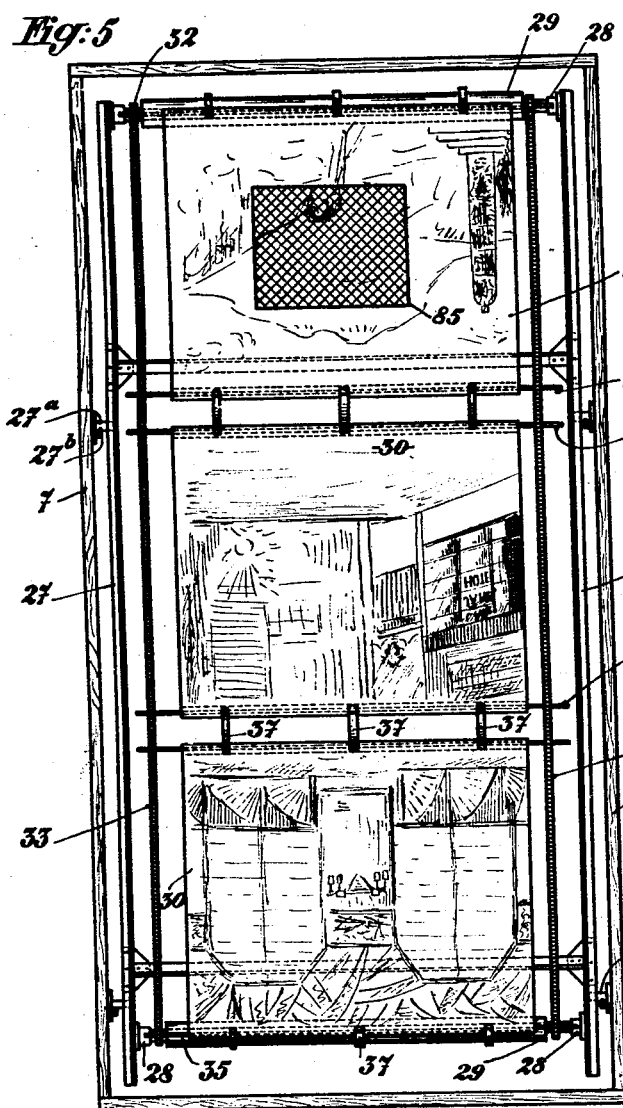
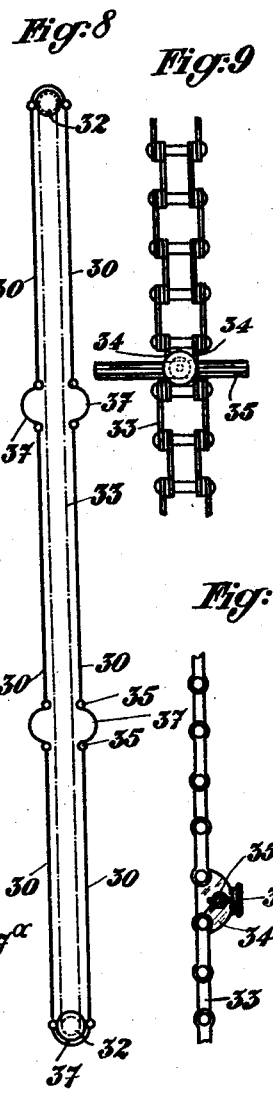
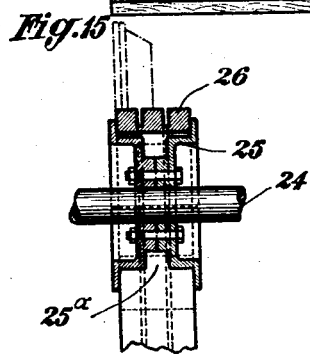
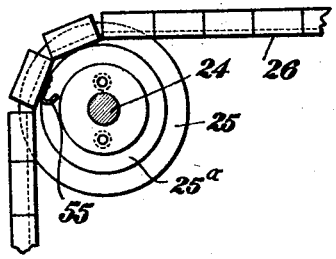
Georges Larcher.
INVENTOR:
By
his Attorney April 28, 1931.  G. LARCHER  1,802,725
MOVING DIORAMA
Filed April 24, 1930   5 Sheets-Sheet 4
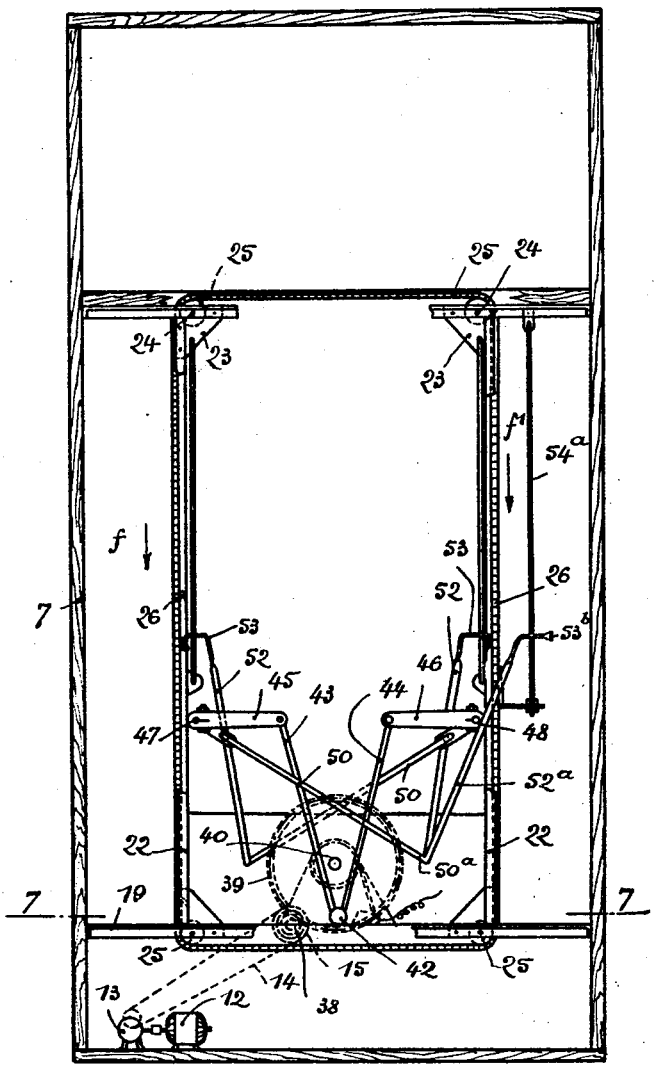
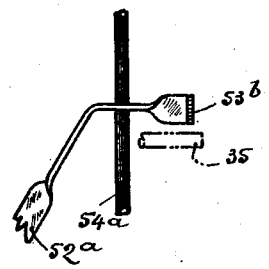
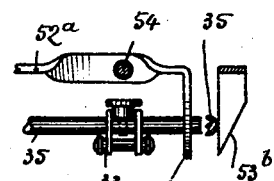
Georges Larcher
INVENTOR;
By
Attorney.

April 28, 1931.     G. LARCHER     1,802,725
MOVING DIORAMA
Filed April 24, 1930     5 Sheets-Sheet 5
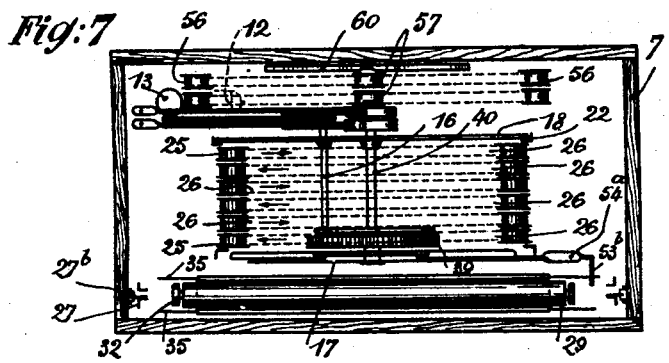
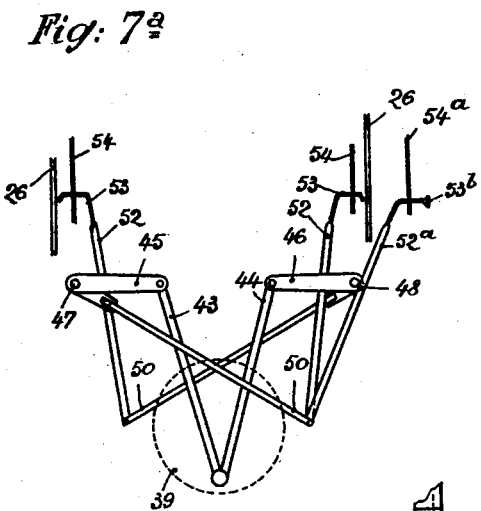
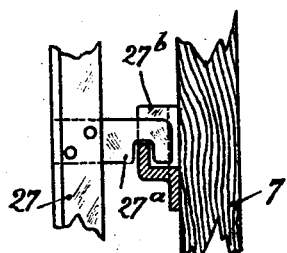
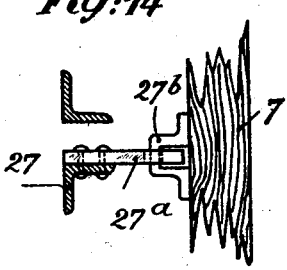
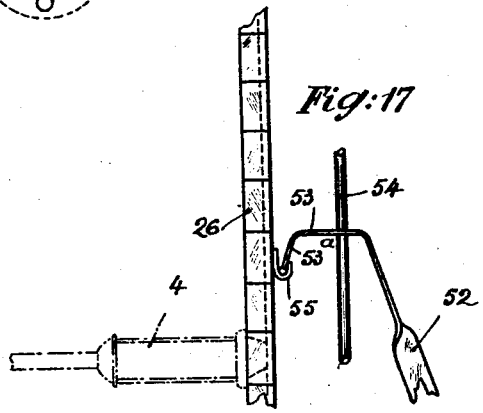
Georges Larcher
INVENTOR:
By
his Attorney.

Patented Apr. 28, 1931

1,802,725

UNITED STATES PATENT OFFICE

GEORGES LARCHER, OF PARIS, FRANCE

MOVING DIORAMA

Application filed April 24, 1930, Serial No. 446,904, and in France May 13, 1929.

My invention relates to an automatic moving diorama which may be applied to all kinds of advertising. Said apparatus is devised to force itself upon the public's notice by amusing it through shiftings of scenes and views for it may be adapted to the showing of various scenes completed by luminous effects in all colours, with a low, moderate or bright lighting, or by phonographic performances synchronously timed in order to perform pieces of music corresponding to the exhibited scenes.

This moving diorama is an electric apparatus, working permanently, day and night, adapted to a new kind of advertising for touristic purposes, theaters, hotels, industrial or commercial firms and so on. It comprises an easily transportable box containing the mechanism, and the decoration of which will vary according to its use, representing a railway station, a theater, a hotel, a factory, a store and so on.

The different parts of said diorama such as characters, scenery, paintings, lighting devices and accessories are interchangeable so that they can readily be replaced without having to modify the mechanism. The latter is automatically adjusted when, for some reason, there is a slight disturbance in the position of a side-walk or of a scene due to the substitution of one character or accessory to another.

One embodiment of my invention, given by way of example, is illustrated in the appended drawings, in which:

Figure 1 is a front view of the whole apparatus, the upper part showing the front of a theater.

Figure 2 is a front view, on a larger scale, of the upper part of the apparatus, the fore-ground curtain being raised in order to show the auditorium and stage of the theater.

Figure 3 is a view similar to Figure 2, the first and the second curtains being raised in order to show a scene of the play.

Figure 4 is an inside view on an enlarged scale, of the front part of the apparatus, showing the control devices for raising the curtains, lighting the lamps, and driving the travelling sidewalks located in the foreground.

Figure 5 is a back view of the apparatus, the rear panel being removed in order to show the endless screen bearing the back scenes.

Figure 6 is similar to Figure 5, the frame on which are mounted the back scenes being removed in order to show the scenes' shifting mechanism.

Figure 7 is a horizontal section on the line 7—7 of Figure 6.

Figures 7ª and 7ᵇ are respectively an elevation and a plan view showing separately the scenes' shifting mechanism.

Figure 8 is a diagrammatic side view of the endless screen bearing the back scenes.

Figures 9 and 10 are respectively a front detail view and a side detail view of the chains on which are mounted the rods serving to connect and sustain the rear panels.

Figures 11 and 12 are respectively a front view and a side view of a hook adapted to the driving of the back scenes.

Figures 13 and 14 are respectively a side view and a plan view of a hook for securing the frame carrying the back scenes to the box of the apparatus.

Figures 15 and 16 are respectively a cross section and a side view of one of the rollers supporting the travelling sidewalks.

Figure 17 is a detail view of the sidewalks' driving device.

Figures 18 and 19 are respectively a partial front view and a cross section of the current distributer for the various lighting apparatus.

Figures 20 and 21 are respectively a side view and a front view of a driving hook for rotating the current distributer.

Figure 22 is a front view of a rheostat for varying the intensity of light.

In the appended drawings the apparatus has been supposed to be used for advertising a theater play.

For this purpose, the upper part of the apparatus represents the front of the theater where the play is performed, as shown in Figures 1 to 3.

Said front may be decorated with flags, flowers or electric lamps as shown in 2.

Ahead of front 1, is provided a sidewalk which may be stationary or moving, and is stationary in the example shown. On said sidewalk are disposed street lamps 3, various figurants 4, a car 5, and so on. Advertising bills may also be posted on front 1.

The central part of front 1 has been cut out, and is closed (Figure 1) by a curtain 6, on which is painted some advertisement. Other advertisements may also be provided on the lower part of the apparatus, as shown in 7.

When curtain 6 is raised through a mechanism that will be described later on, it shows a view such as the one of Figure 2 comprising a part of the auditorium and stage of a theater the curtain 8 of which is lower and covered with advertisements. One can see stage boxes 9, some rows of spectators in the orchestra seats 10, the orchestra itself comprising cut out characters disposed in any suitable manner. The auditorium may be completed by a luster or a visible or hidden lighting device.

In that background are provided two moving platforms similar to those described in the French Patent No. 523,310, filed September 23, 1919, and travelling in opposite directions. On said platforms are secured passers-by which, in the present example will be ushers and program sellers. The conductor (or whatever character it may be in another kind of advertising) is mounted on a pivot, so that one or several stops provided on one of the background moving platforms impart to it, when passing by, a rocking motion. Thanks to this motion, said character will seem to beat time, and will show that the apparatus is working regularly and normally.

The mechanism, by raising afterwards curtain 8, discloses the stage, which represents successively the principal scene of each act of the play which is advertised.

For that purpose, the floor of the stage is made of six moving platforms (Figure 7), which are given a reciprocating motion, and can, through previous adjustment, be moved in opposite directions (two or three moving in one direction, and three or four in the opposite direction). The motion of the platforms may optionally take place either while the curtain is lowered, or when it is raised, or while it is raising, through a previous adjustment.

Every scene is exhibited during a certain time, during which the front lights and the luster are turned out, while the footlights and other stage lights illuminate the scene with a more or less bright glow, tainted in harmony with the scenery. The curtains 6 and 8 are lowered, the inside lights are turned out and the outside lights are again turned up.

It is while both curtains are lowered that the mechanism operates the shifting of the scenes as will be explained further on.

The starting of the apparatus is obtained by means of an ordinary switch which sends current to a small electric motor which drives the mechanism. Said small motor (Figure 6) is located at the bottom of box 7, and is connected with a speed reducer 13 which drives through a chain 14, a pinion 15 keyed on the end of a shaft 16. Said shaft 16 rotates in bearings mounted on plates 17 and 18 made integral with a metallic trussing composed of angle irons, and mounted within the box of the apparatus and in the middle part of it as shown in Figures 6 and 7. Said trussing comprises two frames made of horizontal cross bars 19 fastened to the sides of the box and connected together by uprights 22. The angles of said frames are reinforced by means of gussets.

At the four angles of said frames are provided axles 24 bearing idler wheels 25 round which pass the six travelling platforms 26, each of which takes the shape of an endless chain. To these platforms are previously secured the characters and other accessories that compose the different scenes.

Between the trussing comprising uprights 22 and the rear part of the box, is provided a frame 27 (Figure 5), made of two braced beams or angle irons. At the upper and lower ends of said irons are mounted loose, in small bearings 28, the axles of two cylinders 29 round which passes an endless screen made of the different back scenes 30 (six in the example shown). Frame 27 is supported by hooks 27$^a$ (Figures 13 and 14) secured to the angle irons and resting on supports 27$^b$ secured to the sides of box 7.

The axles of cylinders have, keyed to their ends pinions 32 round which pass two chains 33 shown in detail in the front and side views 9 and 10. Said chains are provided, in certain places, with links made of two small side plates 34 drilled with holes through which passes a rod 35 extending from one chain to the other.

Rods 35 pass also through the hems of every back scene 30, and are prevented from moving laterally by means of screws 36 engaged into tapped holes, located in the vicinity of the ends of said rods. Said screws are preferably disposed between the side plates 34 of each chain.

In order to prevent rods 35 from bending under the tension exerted by back scenes 30, which must keep very plane, said rods are connected by small strainers 37 made of flat bars and provided with an eye at each end for the passing of the rod. The back scenes are hollowed out in suitable places in order to enable to place said small strainers. The latter are suitably curved as shown in Fig. 8, in order to make easier their passing round cylinders 29, and also to give them some elasticity.

Shaft 16, driven by speed reducer 13, carries at the other end a pinion 38 cooperating with a toothed wheel 39 keyed to a shaft 40 running in small bearings mounted on the side plates 17 and 18 (Figure 6).

Wheel 39 is provided with a crank pin 42 on which are mounted two connecting rods 43 and 44, forming a V, linked at their other ends with cranks 45 and 46 which are keyed to shafts 47 and 48 mounted in bearings supported by the uprights 22 of the trussing (Figures 6, 7ª and 7ᵇ).

The rotation of wheel 39 imparts an oscillating motion to cranks 45 and 46, a motion which is transmitted through shafts 47 and 48 to other cranks or arms 49 and 50 keyed to said shafts and made of such a length that their free ends travel along a given path. Flat bar rods 52 provided at their ends with hooks 53 are linked with the ends of arms 49 and 50 (Figures 11, 12 and 17).

Said hooks are provided with holes through which pass guiding rods 54 supported by the trussing uprights.

Hooks 53 are in a suitable number, for instance two on the left side and four on the right side, and are so located that each of them is opposite one of the six moving platforms 26.

Under each of said platforms are provided in suitable positions small hooks 55 turned in the opposite direction to hooks 53.

It follows that for each upward movement of arms 50, rods 52 rise, being all the time guided by rods 54. When hooks 53 come into contact with hooks 55, owing to their ramp shaped nose 53ª (Figure 17) they push aside said hooks 55 and pass over them. When rods 52 move down, hooks 53 drive hooks 55 and with them, the moving platforms; the left side hooks in the direction of arrow $f$, the right side hooks in the direction of arrow $f_1$.

In order that hooks 55 mounted under the platforms pass more easily round the idler rollers 25 said rollers are provided with a groove 25ª in their middle part (Figure 15 and 16).

The length of arms 50 is determined by the amplitude of the forward motion of the platforms which ensures the carrying away of the characters and accessories which have been shown to the public, and their replacement by new characters and accessories which have been previously secured to each platform and which must participate successively in the scenes to be shown.

The shifting of the back scenes is effected in the same way, either at the same time or with a certain delay. For this purpose, a supplementary arm 50ª operates a rod 52ª similar to rods 52, but the end of which, guided by rod 54ª, is bent at right angles in 53ᵇ so as to form a catch provided with an upward ramp. Said ramp pushes aside the ends or rods 35 which it meets during its upward motion, while the catch draws along one of these rods during its downward motion so that the screen is moved of a space corresponding to a back scene.

It is possible, in order to increase the interest or to simulate a vision, to cut out a part of a back scene, as shown in 85 in Figures 3 and 5, and to cover said opening with a transparent cloth, so that said cloth will be brought in front of a stationary character or scenery located behind the back scenes and secured to the frame. A lighting device disposed between the sides of the endless screen, reveals said stationary character or scenery at the right time and through transparency.

It has been said previously that, in front of the scene, were provided two continuously moving platforms travelling in the same direction or in opposite directions.

As shown in Figure 4, said platforms pass round upper rollers which are mounted loose on projections of the axles 24 of the other rollers. But two of said rollers 56 are each integral with a sprocket wheel. Said sprocket wheels are driven one by a direct chain, the other by a crossed chain, both chains passing round pinions keyed on shaft 16 which drives the crank pin wheel.

The tension which is necessary to the friction driving of the platforms is obtained by means of rollers 57 located in the lower part of box 7 and mounted loose on a shaft disposed between the branches of a stirrup 58. Said stirrup is acted upon by one or several springs 59 fastened to the bottom of the box. In order that the stirrup be not drawn laterally by the platforms, it is guided in a groove made in a second stirrup 60, directly secured to the bottom.

At the forward end of shaft 40 are keyed two cams 61, 62 on which run the rollers of two levers 63, 64, which are pivotally mounted in 65 on the side plate 18. The free ends of said levers are fastened, in some adjustable way, to a rod 66 at the end of which is secured a cable 67 which winds around the axle 68 of one of the curtain drums.

The curtains are weighted at their lower edge with a rod the weight of which is sufficient for unrolling the curtain and raising the longer arm of lever 63 or 64. As soon as the roller comes on the sunken part of the rim of the cam, the lever swings, the curtain is lowered, and, by unwinding, drives the drum and its axle and determines the winding of cable 67 around said axle.

When the cam determines the reverse motion of lever 63 or 64, it produces the unwinding of cable 67 and the winding or raising of the curtain.

The control of the different lighting devices is effected by means of a revolving switch 69 (Fig. 4) shown in detail in Figures 18 to 22.

Said switch consists in a cylinder made of an isolating material and mounted on an axle running on supports 70 secured to the lower side of a frame cross piece. At one of its ends, the cylinder is made integral with a ratchet wheel 71 between the teeth of which may enter the hook 72 of a rod linked to a crank 73 which is keyed on a shaft 48. Said rod, which acts as a pawl is given the same reciprocating motion as the other rods 51, so that the lighting and extinction of the lamps is effected at the same time as the shifting of the scenes or with a certain delay according to a previous adjustment.

For this purpose, the cylinder is divided, in the longitudinal direction, into a plurality of isolated parts $a$ $b$ $c$ . . . . and so on. Each part is connected to a source of current by a plate or brush $a_1$, $b_1$, $c_1$.

In the periphery of said cylinder are pierced longitudinal rows of suitably spaced holes. Opposite said holes are provided an equal number of conducting plates 74 secured to an isolated cross piece 75. Each lamp is electrically connected to a lamp of an outside or inside group.

In order that the lamps might be lighted at the given points and in a given number, there is but to screw into the holes of cylinder 69, opposite the plates corresponding to the lamps to be lighted for instance, round head screws, which constitute as many contacts. Said screws are connected to a plate 77 inserted in the cylinder and which receives the current from blades $a_1$, $b_1$, or $c_1$. The current may be sent into said blades by means of a revolving distributer mounted on shaft 40.

The lighting device is completed by a rheostat made of a certain number of resistances each connected to a contact of a series disposed in a circumference. A hand mounted on a shaft rotating in a continuous manner passes successively upon all contacts during the time of exhibition of a scene.

The contacts are connected to resistances so disposed as to increase or decrease progressively. Accordingly, if the rheostat is inserted in the circuit of a group of lamps during the exposition of a scene, the resistances, being successively inserted, will vary the current intensity, and the lamps will pass either from a faint to a bright light or inversely. In that way it will be possible to obtain various luminous effects either white or colored with a set of tainted lamps.

It will also be possible to insert into the circuit of the lamps a stationary rheostat if the scene which is exposed needs an even and continuous lighting.

The insertion into the circuit of a rheostat is effected by means of a drum keyed on shaft 40 and provided with isolated contacts 70 passing under brushes, some of which are directly connected to the lamps while the others are connected to said lamps through the rheostat, said drum being on the other hand connected to a source of current.

While I have disclosed what I deem to be the preferred form of my device, I do not wish to be limited thereto as there might be changes made in the construction, disposition and form of the parts without departing from the spirit of my invention as comprehended within the scope of the appended claims.

What I claim is:—

1. Automatic moving diorama comprising a decorated box, a frame inside said box, rollers mounted on said frame, a plurality of moving platforms in the form of endless bands passing round said rollers, a motor, two shafts mounted on the frame and arms keyed to said shafts, means for imparting to said arms an oscillating motion, rods linked to said arms and hooks on said rods, and oppositely turned hooks mounted on the under side of the endless platforms.

2. Automatic moving diorama comprising a decorated box, a frame inside said box, rollers mounted on said frame, a plurality of moving platforms in the form of endless bands passing round said rollers, an electric motor, two shafts mounted on the frame and arms keyed to said shafts, a toothed wheel driven by said motor, a crank pin on said toothed wheel, two rods mounted on said crank pin, two cranks jointed with said rods and keyed to the shafts, so as to impart an oscillating motion to the arms keyed to said shafts, rods linked to said arms, hooks on said rods, and oppositely turned hooks mounted on the under side of the endless platforms.

3. Automatic moving diorama comprising a decorated box, a frame inside said box, rollers mounted on said frame, a plurality of moving platforms in the form of endless bands passing round said rollers, an electric motor, two shafts mounted on the frame, arms keyed to said shafts, a toothed wheel adapted to be driven by said motor, a crank pin on said toothed wheel, two rods connected to said crank pin, two cranks jointed with said rods and keyed to the shafts, so as to impart an oscillating motion to the arms keyed to said shafts, rods linked to said arms, means for guiding said rods, hooks on said rods and oppositely turned hooks secured to the under side of the endless platforms.

4. Automatic moving diorama comprising a decorated box, a frame inside said box, rollers mounted on said frame, a plurality of moving platforms in the form of endless bands passing round said rollers, an electric motor, a speed reducer, two shafts mounted on the frame, arms keyed to said shafts, a toothed wheel adapted to be driven by said motor through the intermediary of the speed reducer, a crank pin on said toothed wheel, two rods connected to said crank pin, two cranks jointed to said rods and keyed to the shafts, so as to impart an oscillating motion to the arms keyed to said shafts, rods linked to said arms, means for guiding said rods, hooks on said rods and oppositely turned hooks secured to the under side of the endless platforms.

5. Automatic moving diorama comprising a decorated box, a frame inside said box, rollers mounted on said frame, a plurality of moving platforms in the form of endless bands passing round said rollers, a motor, two shafts mounted on the frame, arms keyed to said shafts, means for imparting to said arms an oscillating motion, rods linked to said arms, hooks on said rods, oppositely turned hooks mounted on the under side of the endless platforms and adapted to engage the first mentioned hooks when the rods move in one direction, so that the platforms will be driven by said rods, two parallel cylinders mounted at the top and the bottom of the box, a plurality of back scenes forming an endless screen and passing round said cylinders, small rods engaged in the hems of the back scenes a supplementary rod jointed to one of the above mentioned arms and bent at one end so as to engage one of the small rods of the back scenes and move the back scenes endless screen when the supplementary rod moves in one direction.

6. Automatic moving diorama comprising a decorated box, a frame inside said box, rollers mounted on said frame, a plurality of moving platforms forming endless bands passing round said rollers, two parallel cylinders mounted on the frame at the top and the bottom of the box, a plurality of back scenes forming an endless screen and passing round said cylinders, a motor, two shafts mounted on the frame, arms keyed to said shafts, means for imparting to said arms an oscillating motion, rods linked to said arms, means for imparting, through said rods, a given motion to the moving platforms and to the endless screen whenever to rods move in one direction.

7. Automatic moving diorama comprising a decorated box, a frame inside said box, rollers mounted on said frame, a plurality of moving platforms forming endless bands passing round said rollers, two parallel cylinders mounted on the frame at the top and the bottom of the box, a plurality of back scenes forming an endless screen and passing round said cylinders, a motor, two shafts mounted on the frame, arms keyed to said shafts means for imparting to said arms an oscillating motion, rods linked to said arms, means for imparting, through said rods, a given motion to the moving platforms and to the endless screen whenever the rods move in one direction, a shaft adapted to be driven by the motor, a cam mounted on said shaft, a pivoting lever adapted to bear on said cam, a cylinder at the top of the box, a curtain adapted to be wound round said cylinder, and means for rotating said cylinder whenever the lever pivots.

8. Automatic moving diorama comprising a decorated box, a frame inside said box, rollers mounted on said frame, a plurality of moving platforms forming endless bands passing round said rollers, two parallel cylinders mounted on the frame at the top and the bottom of the box, a plurality of back-scenes forming an endless screen and passing round said cylinders, a motor, two shafts mounted on the frame, arms keyed to said shafts, means for imparting to said arms an oscillating motion, rods linked to said arms, means for imparting through said rods, a given motion to the moving platforms and to the endless screen whenever the rods move in one direction, a shaft adapted to be driven by the motor, a cam mounted on said shaft, a pivoting lever adapted to bear on said cam, a cylinder at the top of the box, a curtain adapted to be wound round said cylinder, means for rotating said cylinder whenever the lever pivots, lamps mounted in various parts in the box, a rotating current distributer adapted to be driven by the motor so as to light the lamps.

In testimony whereof I have signed this specification.

GEORGES LARCHER.